(12) United States Patent
Yonemura et al.

(10) Patent No.: US 10,444,732 B2
(45) Date of Patent: Oct. 15, 2019

(54) BLANK SHAPE DETERMINING METHOD, BLANK, PRESS FORMED PRODUCT, PRESS FORMING METHOD, COMPUTER PROGRAM, AND RECORDING MEDIUM

(71) Applicant: NIPPON STEEL & SUMITOMO METAL CORPORATION, Tokyo (JP)

(72) Inventors: Shigeru Yonemura, Kisarazu (JP); Tohru Yoshida, Chiba (JP); Jun Nitta, Futtsu (JP); Toshiyuki Niwa, Ichihara (JP)

(73) Assignee: NIPPON STEEL CORPORATION, Tokyo (JP)

( * ) Notice: Subject to any disclaimer, the term of this patent is extended or adjusted under 35 U.S.C. 154(b) by 232 days.

(21) Appl. No.: 15/551,182

(22) PCT Filed: Mar. 24, 2016

(86) PCT No.: PCT/JP2016/059485
§ 371 (c)(1),
(2) Date: Aug. 15, 2017

(87) PCT Pub. No.: WO2016/158699
PCT Pub. Date: Oct. 6, 2016

(65) Prior Publication Data
US 2018/0032057 A1    Feb. 1, 2018

(30) Foreign Application Priority Data
Mar. 27, 2015 (JP) ................ 2015-067159

(51) Int. Cl.
*G05B 19/4093* (2006.01)
*B21D 22/00* (2006.01)
(Continued)

(52) U.S. Cl.
CPC ....... *G05B 19/40932* (2013.01); *B21D 22/00* (2013.01); *B21D 22/02* (2013.01);
(Continued)

(58) Field of Classification Search
None
See application file for complete search history.

(56) References Cited

U.S. PATENT DOCUMENTS

2011/0192232 A1    8/2011  Kuwayama et al.
2012/0123579 A1    5/2012  Kubli et al.
(Continued)

FOREIGN PATENT DOCUMENTS

CN    102176988 A    9/2011
CN    103286185 A    9/2013
(Continued)

OTHER PUBLICATIONS

Chinese Office Action and Search Report, dated Sep. 29, 2018 for corresponding Chinese Application No. 201680016027.7, with English translations.
(Continued)

*Primary Examiner* — Sean Shechtman
(74) *Attorney, Agent, or Firm* — Birch, Stewart, Kolasch & Birch, LLP

(57) ABSTRACT

A blank shape determining method includes: a process of making a forming analysis of forming a reference blank into a reference formed product and a acquiring sheet thickness distribution and a plastic strain distribution; a process of acquiring a forming failure evaluation index for the reference blank; a process of estimating a region, which includes an end edge portion at which the forming failure evaluation index exceeds a predetermined threshold, within the reference blank as a forming failure region; a process of generating a plurality of corrected blanks; a process of making a
(Continued)

forming analysis of forming the corrected blanks into corrected formed products and acquiring a sheet thickness distribution and a plastic strain distribution; a process of acquiring the forming failure evaluation index for the corrected formed product; and a process of determining a shape of the corrected blank having a smallest maximum value of the forming failure evaluation index as a shape of a blank provided for press forming.

24 Claims, 10 Drawing Sheets

(51) Int. Cl.
    *G06F 17/50*     (2006.01)
    *B21D 22/02*     (2006.01)
    *B21D 53/88*     (2006.01)

(52) U.S. Cl.
    CPC .......... *G06F 17/5018* (2013.01); *B21D 53/88* (2013.01); *G05B 2219/36278* (2013.01); *G06F 17/5095* (2013.01); *G06F 2217/42* (2013.01)

(56) References Cited

U.S. PATENT DOCUMENTS

2013/0213109 A1    8/2013    Ogasawara
2017/0337304 A1*  11/2017  Minote ................ B21D 22/022

FOREIGN PATENT DOCUMENTS

| | | |
|---|---|---|
| EP | 0550390 A1 | 7/1993 |
| JP | 10-166070 A | 6/1998 |
| JP | 2002-60898 A | 2/2002 |
| JP | 2004-342010 A | 12/2004 |
| JP | 2006-257506 A | 9/2006 |
| JP | 2008-119736 A | 5/2008 |
| JP | 2009-61477 A | 3/2009 |
| JP | 2009-136880 A | 6/2009 |
| JP | 2009-214118 A | 9/2009 |
| JP | 2014-117728 A | 6/2014 |
| RU | 2096115 C1 | 11/1997 |
| RU | 2192046 C1 | 10/2002 |
| SU | 958010 A1 | 9/1982 |

OTHER PUBLICATIONS

Russian Office Action and Search Report, dated Oct. 1, 2018, for corresponding Russian Application No. 2017132169, with English translations.

Extended European Search Report for counterpart European Application No. 16772580.3, dated Nov. 6, 2018.

Hu et al., "Optimization of Sheet Metal Forming Processes by Adaptive Response Surface Based on Intelligent Sampling Method," Journal of Materials Processing Technology, vol. 197, No. 1-3, 2008 (available Dec. 14, 2007), pp. 77-88.

Toan et al., "Finite Element Method Simulations to Improve Press Formability of Door Hinge," JMEPEG, vol. 18, No. 8, Nov. 2009, pp. 1005-1011.

International Search Report for PCT/JP2016/059485 (PCT/ISA/210) dated Jun. 28, 2016.

Notice of Reasons for Rejection issued in Japanese Application No. 2016-555628 dated Jan. 17, 2017.

Written Opinion of the International Searching Authority for PCT/JP2016/059485 (PCT/ISA/237) dated Jun. 28, 2016.

* cited by examiner

FIRST PROCESS (DRAWING FORMING)

SECOND PROCESS (FLANGE-UP FORMING)

$m_1 < m_2$

BLANK SHAPE DETERMINING METHOD, BLANK, PRESS FORMED PRODUCT, PRESS FORMING METHOD, COMPUTER PROGRAM, AND RECORDING MEDIUM

TECHNICAL FIELD

The present invention relates to a blank shape determining method capable of avoiding forming failure such as a stretch flange fracture or a wrinkle during press forming, a blank, a press formed product, a press forming method, a computer program, and a recording medium.

Priority is claimed on Japanese Patent Application No. 2015-067159, filed on Mar. 27, 2015, the content of which is incorporated herein by reference.

BACKGROUND ART

Recently, an improvement in fuel efficiency is expected to reduce the amount of carbon dioxide emission, which is considered as one cause of global warming, in the automotive industry. To reduce the amount of carbon dioxide emission, measures such as improving engine efficiency and transmission efficiency and reducing a weight of a vehicle body are expected in addition to a fundamental measure caused by adoption of alternative fuel. Conversely, development of a vehicle body having excellent collision safety satisfying requirements for collision safety regulations that have been made stricter is simultaneously expected.

A vehicle body satisfying requirements for collision safety regulations can be formed with a low-strength steel sheet, for instance, by arranging many reinforced components and increasing a sheet thickness of a blank for a component. However, since a weight of the vehicle body is increased by arranging the reinforced components and increasing the sheet thickness of the blank for the component, a request that the weight of the vehicle body be reduced is not satisfied. To satisfy conflicting requests that the weight of the vehicle body be reduced and collision safety performance be improved, a high-strength steel sheet is adopted as a steel sheet for the vehicle body of the vehicle. A steel sheet having a tensile strength of about 440 MPa has been adopted as the steel sheet for the vehicle body of the vehicle. However, in recent years, a 590 MPa-class steel sheet, and furthermore a 980 MPa-class steel sheet, has been adopted as the steel sheet for the vehicle body of the vehicle. The high-strength steel sheet is adopted as the steel sheet for the vehicle body of the vehicle so that the requests that the weight of the vehicle body be reduced and the collision safety performance be improved can be satisfied. However, as strength of the steel sheet has been improved, there is a possibility of reducing formability. Since a high-strength steel sheet has been adopted as the steel sheet for the vehicle body of the vehicle, an improvement in formability, and particularly an improvement in stretch flange formability, is expected. In general, stretch flange formability is evaluated with a limit hole expansion rate $\lambda$ in a conical punch hole expansion test.

Since a stretch flange fracture is considered to occur when elongation strain of a flange end in a circumferential direction exceeds a limit value, steel sheets having an improved stretch flange formability, namely various steel sheets having a high hole expansion rate, are known.

A steel sheet in which stretch flange formability is improved by controlling a microstructure, such as ferrite or bainite, is described in Patent Document 1.

An aluminum alloy sheet having excellent stretch flange formability regulating uniform elongation in a specific direction in plastic anisotropy and a tensile test is described in Patent Document 2.

When a material is isotropic, the material is deformed in a hole expansion test while axial symmetry thereof is maintained. Therefore, in the hole expansion test of the isotropic material, an increase in elongation strain of a circumferential end of the isotropic material is uniform, and a local fracture limit major strain when a fracture occurs becomes a value corresponding to the limit hole expansion rate $\lambda$. However, a portion having a possibility of a stretch flange fracture occurring at a steel sheet which is actually used as the steel sheet for the vehicle body of the vehicle or the like is a portion at which an end of the steel sheet extends in axial symmetry, as in the hole expansion test, in addition to a portion at which the strain is distributed in a circumferential direction of the end of the steel sheet. For example, a stretch flange fracture occurs when a strain distribution occurs in the circumferential direction of the end of the steel sheet during the forming and when the localized strain exceeds a limit value of ductility of the material. The following two measures exist to prevent the occurrence of the stretch flange fracture attributed to the strain distribution in the circumferential direction of the end of the steel sheet.

(1) Improving fracture limit major strain by adopting a steel sheet having a good hole expansion rate.

(2) Suppressing localization of the strain by improving a die shape, forming conditions, and a method of construction to regularize the strain.

To regularize the stain, various forming methods of relieving strain concentration on a portion having a high possibility of causing a stretch flange fracture by optimizing a press process and adjusting a shape of the end edge portion of the component are known (for example, see Patent Documents 3 to 5).

A method of projecting the portion having a high possibility of causing a stretch flange fracture, performing pre-deformation to reduce an amount of change of a local length at a flange end thereof, and controlling a deformation history to suppress generation of the local strain when the strain leading to a press bottom dead center is increased is described in Patent Document 3.

A method of suppressing the local concentration of the strain by performing deformation history control on the strain distribution of the portion having a high possibility of causing an elongation strain fracture in a plurality of processes is described in Patent Document 4.

The methods described in Patent Documents 3 and 4 have a problem in that a die design and a process design are complicated and that an adoptable component shape is limited, and are not easily put into practical use.

A method of increasing a curvature radius of an end edge portion of a component of the portion having a high possibility of causing a stretch flange fracture, suppressing the strain concentration along a flange end in the circumferential direction, and preventing the generation of the stretch flange fracture is described in Patent Document 5. In the method described in Patent Document 5, a ratio between a radius R1, which has an offset with the same length as a flange directed to an end of the component from a die corner radius, and an end corner radius R2 is set to R2/R1≥2 so that the strain concentration at the end is suppressed. However, the portion at which the stretch flange fracture occurs when the steel sheet is actually used is included in an end edge portion having a shape in which a curve whose curvature is changed and a straight line are continuously formed. For this reason, an adjusting region of the end edge portion suppressing the strain concentration of the flange end, and versatile design guides of the end edge portion such as a curvature and a radius of the end edge portion are not easily set. The adjustment of the end edge portion suppressing the strain concentration of the flange end needs to repeatedly produce a prototype a plurality of times and has a possibility that a load of a designer is increased.

FIG. 1A is a view illustrating a first example of flange-up forming, and FIG. 1B is a view illustrating a second example of flange-up forming. In the example illustrated in each of FIGS. 1A and 1B, a shape of a component on which a hole expansion test is performed by a cylindrical punch is divided, and a forming test simulating the flange-up forming is performed. A die used in the forming test has a die shoulder R of 5 mm and a diameter of 106 mm, and the cylindrical punch has a shoulder R of 10 mm and a diameter of 100 mm. A blank used in the forming test is a steel sheet having a tensile strength of about 440 MPa and a sheet thickness of 1.4 mm. The blank is sheared to 180 mm square, and is then cut into quarters. Afterwards, a corner of the blank is machined with a punch having a radius of 30 mm in the example illustrated in FIG. 1A, or a radius of 60 mm in the example illustrated in FIG. 1B.

In the example illustrated in FIG. 1A, a stretch flange fracture occurs at an end of the component. In the example illustrated in FIG. 1A, a strain of 0.36 in a circumferential direction is introduced into a fracture part so that a stretch flange fracture occurs. In the example illustrated in FIG. 1B, since a die corner radius has an end corner radius that is two times an offset radius, strain concentration of the end in a circumferential direction is reduced so that no crack occurs at a flange-up end. However, in the example illustrated in FIG. 1B, strain exceeding 0.3 is introduced to an end around a vertical wall passing the die shoulder and a crack occurs at the end around the vertical wall.

CITATION LIST

Patent Document

[Patent Document 1]
Japanese Unexamined Patent Application, First Publication No. 2002-60898
[Patent Document 2]
Japanese Unexamined Patent Application, First Publication No. 2006-257506
[Patent Document 3]
Japanese Unexamined Patent Application, First Publication No. 2008-119736
[Patent Document 4]
Japanese Unexamined Patent Application, First Publication No. 2014-117728
[Patent Document 5]
Japanese Unexamined Patent Application, First Publication No. 2009-214118

SUMMARY OF INVENTION

Technical Problem

When a curvature of an edge shape of the component is adjusted to inhibit the strain from being concentrated on the end in the circumferential direction as in the example illustrated in FIG. 1A, the strain is concentrated on the end around the vertical wall as in the example illustrated in FIG. 1B. When the curvature of the edge shape of the component is adjusted to reduce the strain concentration of the portion having a possibility of causing the stretch flange fracture, there is a possibility of the strain concentration occurring at the end around that portion, and it is not easy to suppress the occurrence of the strain concentration over the entire component.

The same problem exists in a shape failure of the stretch flange fracture as well as a shape failure of a wrinkle. The same problem exists in components in the fields of various vehicles, typical machines, consumer electronics, and ships without being limited to the vehicle component.

Therefore, an object of the present invention is to provide a blank shape determining method in which a shape of an end edge portion having a low possibility of causing a stretch flange fracture or a wrinkle can be efficiently determined and a shape failure such as a stretch flange fracture or a wrinkle during press forming can be avoided without increasing processes of the press forming, a blank, a press formed product, a press forming method, a computer program, and a recording medium.

Solution to Problem

To solve the above problems, the inventors of the invention have conceived the aspects of the invention shown below as a result of intensive studies.

(1) A first aspect of the present invention is a blank shape determining method that includes: a first calculating process of making a forming analysis of forming a reference blank ($B_0$) into a reference formed product ($P_0$) on the basis of material parameters, forming conditions, and analytical models, and acquiring a sheet thickness distribution ($D_T$) and a plastic strain distribution ($D_S$); a first forming failure evaluation index acquiring process of acquiring a forming failure evaluation index (I) for the reference blank ($B_0$) on the basis of the sheet thickness distribution ($D_T$) and the plastic strain distribution ($D_S$) that are acquired in the first calculating process; a forming failure region estimating process of estimating a region, which includes an end edge portion ($\alpha_E$) at which the forming failure evaluation index (I) exceeds a predetermined threshold, within the reference blank ($B_0$) as a forming failure region ($\alpha$); a corrected blank generating process of generating a plurality of corrected blanks ($B_i$) (where i=1, 2, 3 ... n), in each of which a shape of the end edge portion ($\alpha_E$) is corrected; a second calculating process of making a forming analysis of forming the plurality of corrected blanks ($B_i$) into corrected formed products ($P_i$) on the basis of the material parameters, the forming conditions, and the analytical models, and acquiring the sheet thickness distribution ($D_T$) and the plastic strain distribution ($D_S$); a second forming failure evaluation index acquiring process of acquiring the forming failure evaluation index (I) for the corrected formed products ($P_i$) on the basis of the sheet thickness distribution ($D_T$) and the plastic strain distribution ($D_S$) that are acquired in the second calculating process; and a blank shape determining process of determining a shape of the corrected blank ($B_i$) having a smallest maximum value of the forming failure evaluation index (I) as a shape of a blank (B) provided for press forming.

(2) In the blank shape determining method described in (1) above, in the forming failure region estimating process, the end edge portion ($\alpha_E$) included in the forming failure region ($\alpha$) may include a linear section ($\alpha_S$) and a curvilinear section ($\alpha_C$).

(3) In the blank shape determining method described in (2) above, in the corrected blank generating process, a shape of a region including a singular point extracted from a curvature of the curvilinear section ($\alpha_C$) within the end edge portion ($\alpha_E$) of the reference blank ($B_0$) may be corrected to generate the plurality of corrected blanks ($B_i$).

(4) In the blank shape determining method described in any one of (1) to (3) above, the corrected blank generating process may include: within the end edge portion ($\alpha_E$) included in the forming failure region ($\alpha$), setting at least one of element points at which the forming failure evaluation index (I) is higher than an average value at the end edge portion ($\alpha_E$) as a representative element point ($E_R$); and setting each element point other than the representative element point ($E_R$) as a following element point ($E_F$); and the representative element point ($E_R$) and the following element point ($E_F$) may be moved a plurality of times in a predetermined direction to generate the plurality of corrected blanks ($B_i$).

(5) In the blank shape determining method described in (4) above, in the corrected blank generating process, the predetermined direction may be a normal direction of the end edge portion ($\alpha_E$) at the representative element point ($E_R$).

(6) In the blank shape determining method described in (4) or (5) above, in the corrected blank generating process, the element points may be moved in the predetermined direction in units of predetermined amount to generate the plurality of corrected blanks ($B_i$).

(7) In the blank shape determining method described in any one of (4) to (6) above, in the corrected blank generating process, a single movement amount of the representative element point ($E_R$) may be smaller than that of the following element point ($E_F$).

(8) In the blank shape determining method described in any one of (4) to (7) above, the corrected blank generating process may include: determining whether the forming failure evaluation index (I) increases as the representative element point ($E_R$) is moved in the predetermined direction; and when it is determined that the forming failure evaluation index (I) increases as the representative element point ($E_R$) is moved in the predetermined direction, moving the representative element point ($E_R$) in a direction opposite to the predetermined direction to generate the plurality of corrected blanks ($B_i$).

(9) In the blank shape determining method described in any one of (1) to (8) above, a forming failure may be a stretch flange fracture, and the forming failure evaluation index (I) may be a sheet thickness decrease rate.

(10) In the blank shape determining method described in any one of (1) to (8) above, a forming failure may be a stretch flange fracture, and the forming failure evaluation index (I) may be a hole expansion rate.

(11) In the blank shape determining method described in any one of (1) to (8) above, a forming failure may be a stretch flange fracture, and the forming failure evaluation index (I) may be a comparative value between a maximum major strain ($\varepsilon_1$) and a fracture limit major strain ($\varepsilon_1^*$).

(12) In the blank shape determining method described in any one of (1) to (8) above, a forming failure may be a wrinkle, and the forming failure evaluation index (I) may be a sheet thickness increase rate.

(13) A second aspect of the present invention is a blank obtained using the blank shape determining method described in any one of (1) to (12) above.

(14) A third aspect of the present invention is a press formed product obtained by press forming the blank described in (13) above.

(15) A fourth aspect of the present invention is a press forming method comprising a press forming process of press forming the blank described in (13) above.

(16) A fifth fourth aspect of the present invention is a computer program performing: using a calculation device, a first calculating process of making a forming analysis of forming a reference blank ($B_0$) into a reference formed product ($P_0$) on the basis of material parameters, forming conditions, and analytical models, and acquiring a sheet thickness distribution ($D_T$) and a plastic strain distribution ($D_S$); a first forming failure evaluation index acquiring process of acquiring a forming failure evaluation index (I) for the reference blank ($B_0$) on the basis of the sheet thickness distribution ($D_T$) and the plastic strain distribution ($D_S$) that are acquired in the first calculating process; a forming failure region estimating process of estimating a region, which includes an end edge portion ($\alpha_E$) at which the forming failure evaluation index (I) exceeds a predetermined threshold within the reference blank ($B_0$), as a forming failure region ($\alpha$); a corrected blank generating process of generating a plurality of corrected blanks ($B_i$) (where i=1, 2, 3 ... n), in each of which a shape of the end edge portion ($\alpha_E$) is corrected; a second calculating process of making a forming analysis of forming the plurality of corrected blanks ($B_i$) into corrected formed products ($P_i$) on the basis of the material parameters, the forming conditions, and the analytical models, and acquiring the sheet thickness distribution ($D_T$) and the plastic strain distribution ($D_S$); a second forming failure evaluation index acquiring process of acquiring the forming failure evaluation index (I) for the corrected formed products ($P_i$) on the basis of the sheet thickness distribution ($D_T$) and the plastic strain distribution ($D_S$) that are acquired in the second calculating process; and a blank shape determining process of determining a shape of the corrected blank ($B_i$) having a smallest maximum value of the forming failure evaluation index (I) as a shape of a blank (B) provided for press forming.

(17) In the computer program described in (16) above, in the forming failure region estimating process, the end edge portion ($\alpha_E$) included in the forming failure region ($\alpha$) may include a linear section ($\alpha_S$) and a curvilinear section ($\alpha_C$).

(18) In the computer program described in (17) above, in the corrected blank generating process, a shape of a region including a singular point extracted from a curvature of the curvilinear section ($\alpha_C$) within the end edge portion ($\alpha_E$) of the reference blank ($B_0$) may be corrected to generate the plurality of corrected blanks ($B_i$).

(19) In the computer program described in any one of (16) to (18) above, the corrected blank generating process may include: within the end edge portion ($\alpha_E$) included in the forming failure region ($\alpha$), setting at least one of element points at which the forming failure evaluation index (I) is higher than an average value at the end edge portion ($\alpha_E$) as a representative element point ($E_R$); and setting each of element points other than the representative element point ($E_R$) as a following element point ($E_F$); and the representative element point ($E_R$) and the following element point ($E_F$) may be moved a plurality of times in a predetermined direction to generate the plurality of corrected blanks ($B_i$).

(20) In the computer program described in (19) above, in the corrected blank generating process, the predetermined direction may be a normal direction of the end edge portion ($\alpha_E$) at the representative element point ($E_R$).

(21) In the computer program described in (19) or (20) above, in the corrected blank generating process, the element points may be moved in the predetermined direction in units of predetermined amount to generate the plurality of corrected blanks ($B_i$).

(22) In the computer program described in any one of (19) to (21) above, in the corrected blank generating process, a single movement amount of the representative element point ($E_R$) may be smaller than that of the following element point ($E_F$).

(23) In the computer program described in any one of (19) to (22) above, the corrected blank generating process may include: determining whether the forming failure evaluation index (I) increases as the representative element point ($E_R$) is moved in the predetermined direction; and when it is determined that the forming failure evaluation index (I) increases as the representative element point ($E_R$) is moved in the predetermined direction, moving the representative element point ($E_R$) in a direction opposite to the predetermined direction to generate the plurality of corrected blanks ($B_i$).

(24) In the computer program described in any one of (16) to (23) above, a forming failure may be a stretch flange fracture, and the forming failure evaluation index (I) may be a sheet thickness decrease rate.

(25) In the computer program described in any one of (16) to (23) above, a forming failure may be a stretch flange fracture, and the forming failure evaluation index (I) may be a hole expansion rate.

(26) In the computer program described in any one of (16) to (23) above, a forming failure may be a stretch flange fracture, and the forming failure evaluation index (I) may be a comparative value between a maximum major strain ($\varepsilon_1$) and a fracture limit major strain ($\varepsilon_1^*$).

(27) In the computer program described in any one of (16) to (23) above, a forming failure may be a wrinkle, and the forming failure evaluation index (I) may be a sheet thickness increase rate.

(28) A sixth aspect of the present invention is a computer-readable recording medium in which the computer program described in any one of (16) to (27) is recorded.

Advantageous Effects of Invention

According to the present invention, the blank shape capable of avoiding a forming failure such as a stretch flange fracture or a wrinkle during flange forming can be determined. Accordingly, the blank shape leads to a reduction in manufacturing cost and a material having a higher strength can be applied, so that a reduction in weight of the press formed product can be expected.

DESCRIPTION OF EMBODIMENTS

The inventors of the present invention have found that a reference formed product, which is formed from a reference blank having a reference blank shape, and a corrected formed product, which is formed from a corrected blank having a corrected blank shape in which a shape of an end edge portion of the reference blank shape is corrected by an adequate method, are compared using a predetermined forming failure evaluation index so that a shape of the end edge portion thereof can be efficiently determined and a possibility of causing a shape failure such as a stretch flange fracture or a wrinkle is reduced.

The end edge portion is not limited to only an outer end edge portion of the blank, but also includes an inner end edge portion of the blank when an opening is formed in the blank.

Embodiments of the present invention based on the above findings will be described below in detail on the basis of the drawings.

Figure 1A:
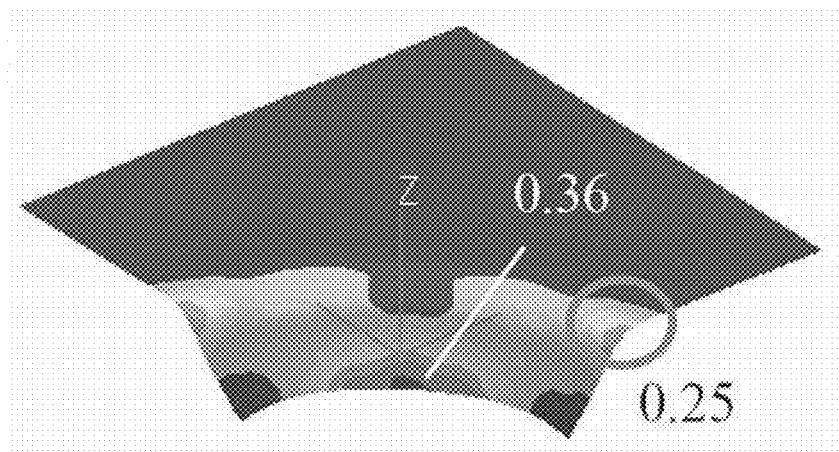
FIG. 1A is a diagram illustrating a first example of flange-up forming.
Figure 1B:
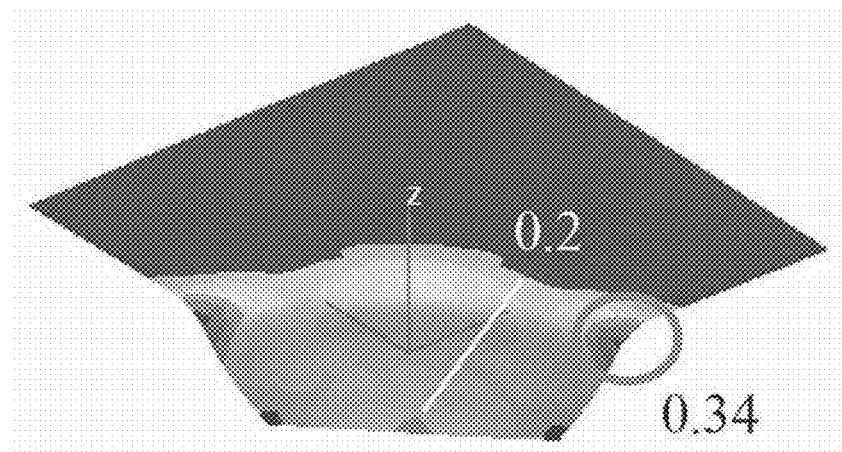
FIG. 1B is a diagram illustrating a second example of the flange-up forming.
Figure 2:
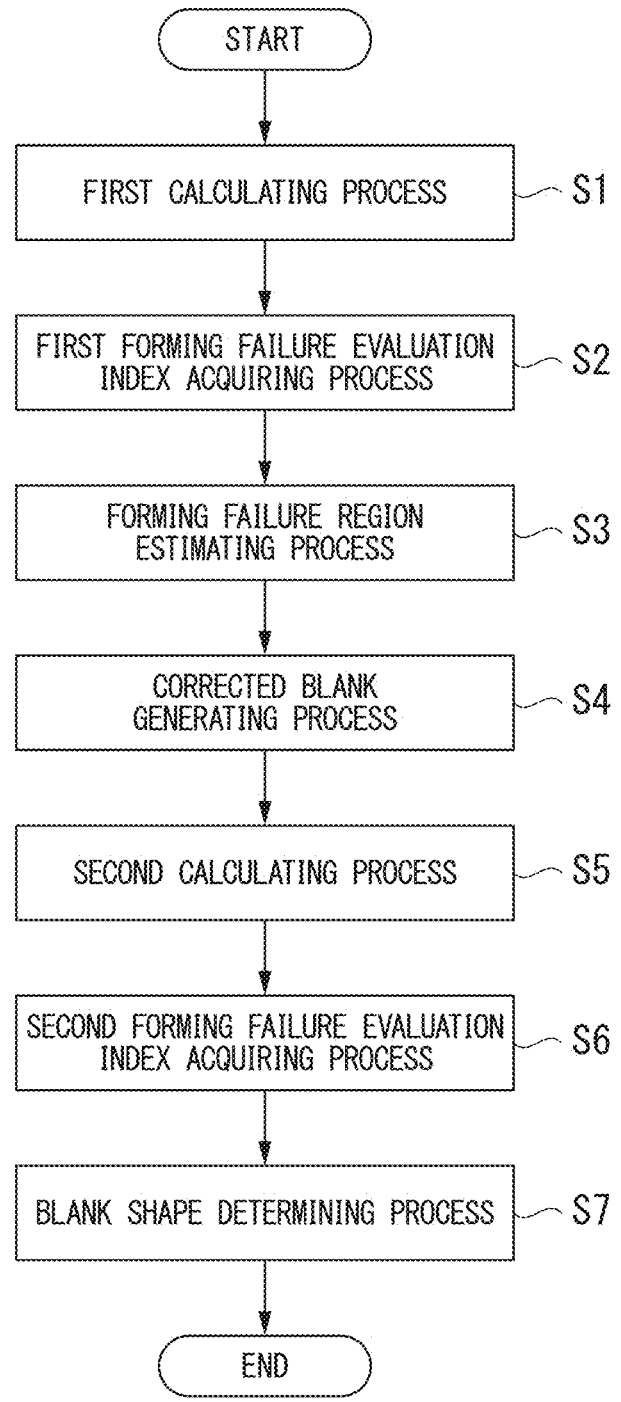
FIG. 2 is a flow chart illustrating processes of a blank shape determining method according to an embodiment of the present invention.

FIG. 2 is a flow chart illustrating processes of a blank shape determining method according to an embodiment of the present invention. As illustrated in the flow chart, the blank shape determining method according to the present embodiment has a first calculating process S1, a first forming failure evaluation index acquiring process S2, a forming failure region estimating process S3, a corrected blank generating process S4, a second calculating process S5, a second forming failure evaluation index acquiring process S6, and a blank shape determining process S7.

(First Calculating Process S1)

In the first calculating process S1, a forming analysis of forming a reference blank $B_0$ into a reference formed product $P_0$ is made on the basis of material parameters, forming conditions, and analytical models of a component, and information about a sheet thickness distribution $D_T$ and a plastic strain distribution $D_S$ for the reference blank $B_0$ and the reference formed product $P_0$ is acquired by a calculation device.

The material parameters, the forming conditions, and the analytical models of the component are conditions used in evaluating formability and are pieces of information stored in the calculation device.

The material parameters of the component include yield strength, tensile strength, a relation between stress and strain, an r value, a sheet thickness, and a friction coefficient.

The forming conditions include conditions such as a wrinkle pressing load (blank holding load), a punch, a pad, and the like.

The analytical models include a finite element model of a tool and a finite element model of the blank.

In the first calculating process S1, the forming analysis from the reference blank $B_0$ having a blank shape acting as a reference for the reference formed product $P_0$ is made on the basis of the material parameters, the forming conditions, and the analytical models.

A shape of the reference blank $B_0$ and a shape of the reference formed product $P_0$ may be any shape as long as the shape is in an early stage of design.

A forming analysis software program, such as a finite element method (FEM) analysis software program, may be used for the forming analysis.

(First Forming Failure Evaluation Index Acquiring Process S2)

In the first forming failure evaluation index acquiring process S2, a forming failure evaluation index I is acquired for at least a part of a region in the reference blank $B_0$ on the basis of the sheet thickness distribution $D_T$ and the plastic strain distribution $D_S$ of the reference blank $B_0$, which are acquired in the first calculating process S1.

The forming failure evaluation index I is an index indicating that as a value thereof increases, a possibility of causing a forming failure increases.

When a stretch flange fracture is a target for forming failure evaluation, it is shown that, as the value of the forming failure evaluation index I increases, the possibility of causing the stretch flange fracture increases. For this reason, a "sheet thickness decrease rate," a "hole expansion rate," or a "value of comparison between a maximum major strain $\varepsilon_1$ and a fracture limit major strain $\varepsilon_1^*$" can be used as the forming failure evaluation index I.

The "value of comparison between the maximum major strain $\varepsilon_1$ and the fracture limit major strain $\varepsilon_1^*$" can be obtained using a forming limit diagram (FLD).

The FLD is a diagram showing a maximum major strain giving a fracture limit for each minimum major strain, and is generally shown in a graph in which the minimum major strain is set as a horizontal axis and the maximum major strain is set as a vertical axis. The FLD can be drawn on the basis of either an experiment or theory. A measuring method of the FLD according to the experiment generally includes pre-drawing a circular or latticed pattern on a surface of a metal sheet using etching or the like, fracturing the metal sheet by hydraulic forming or projection forming using a rigid tool, and then measuring a fracture limit major strain using an amount of circle deformation. A fracture limit line is obtained by applying a load to the metal sheet with respect to various in-plane strain ratios, plotting the fracture limit major strain on an axis of the major strain at each strain ratio, and connecting the plotted results with a line.

Figure 3:
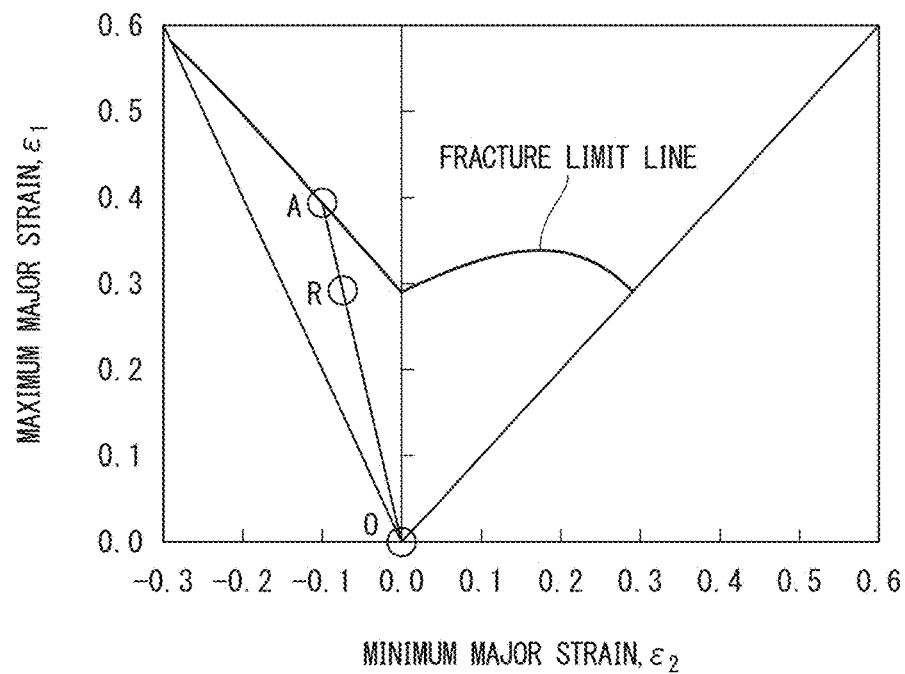
FIG. 3 is an explanatory view of FLD.

A strain attributed to the occurrence of local constriction is calculated and obtained by a plastic instability theory as theoretical prediction of the FLD. A theoretical prediction in which a work-hardening characteristic determined on the basis of a stress-strain curve obtained by a tensile test is approximated by a so-called Swift expression ($\sigma_{cu}=K(\varepsilon_0+\varepsilon_{cq})^n$) is used in an example. The maximum major strain $\varepsilon_1^*$ giving the fracture limit can be determined for each minimum major strain by Expressions 1 to 3 using parameters K, $\varepsilon_0$, and n of the Swift expression, a strain ratio $\rho=\varepsilon_2/\varepsilon_1$, and a sheet thickness $t_0$. The evaluation of a fracture is performed by comparing a positional relation between the fracture limit line obtained in this way and a strain state of each site which is obtained from a result of simulation according to the FEM of a plastic deformation process, and determines that a fracture or a risk thereof is high when a strain of a deformation process reaches the limit strain. In the present invention, since there is a need to quantify a fracture risk ratio while changing the blank shape, for example as illustrated in FIG. 3, when the strain state of the element obtained by the FEM is defined as R and an intersection between a straight line connecting an origin O and R and a fracture limit line is defined as A, the forming failure evaluation index I can use a value (a comparison value) of OR/OA. To be specific, when a maximum major strain of the point A on the fracture limit line is set as $\varepsilon_1^*$ and a maximum major strain of the element obtained by the FEM is set as $\varepsilon_1$, the forming failure evaluation index I can be calculated using the major strains of the point A and the element as $\varepsilon_1/\varepsilon_1^*$.

$$\varepsilon_1^* = \frac{n^*}{1+\rho}(\rho<0) \qquad \text{[Math. 1]}$$

$$\varepsilon_1^* = \frac{2n^*(\rho^2+\rho+1)}{(\rho+1)(2\rho^2-\rho+2)}(\rho\geq 0) \qquad \text{[Math. 2]}$$

$$n^* = \ln\left[1+\frac{n}{0.21}(0.233+0.141t_0)\right] \qquad \text{[Math. 3]}$$

The calculation device evaluates a possibility of a stretch flange fracture by comparing the calculated fracture limit line $\varepsilon_1^*$ and pieces of information on the basis of the information showing the calculated fracture limit line $\varepsilon_1^*$ and information showing the strain state of the portion of each of the reference blank $B_0$ and the reference formed product $P_0$, which is obtained from the result of simulation according to the FEM.

For example, the calculation device evaluates the possibility of a stretch flange fracture by comparing the calculated fracture limit line $\varepsilon_1^*$ and the maximum major strain on the basis of the calculated fracture limit line $\varepsilon_1^*$ and the maximum major strain of the portion of each vehicle component which is obtained from the result of simulation according to the FEM.

In the case in which the hole expansion rate is used as the forming failure evaluation index I, when a hole expansion rate $\lambda$ [%] acquired by a conical punch hole expansion test is used as a determination criterion of the stretch flange fracture, the evaluation may be performed by comparing the maximum major strain $\varepsilon_1$ of each portion acquired from the forming analysis and a fracture limit major strain acquired from the hole expansion rate. Here, the evaluation may be performed by defining the fracture limit major strain $\varepsilon_1^*$ as $\ln(1+\lambda/100)$ and quantifying the fracture limit major strain $\varepsilon_1^*$ as a fracture risk ratio $\varepsilon_1/\varepsilon_1^*$.

When a wrinkle is a target for the forming failure evaluation, it is shown that, as a value of the forming failure evaluation index I increases, the possibility of causing a wrinkle increases. Thus, a sheet thickness increase rate can be used as the forming failure evaluation index I.

(Forming Failure Region Estimating Process S3)

Figure 4A:
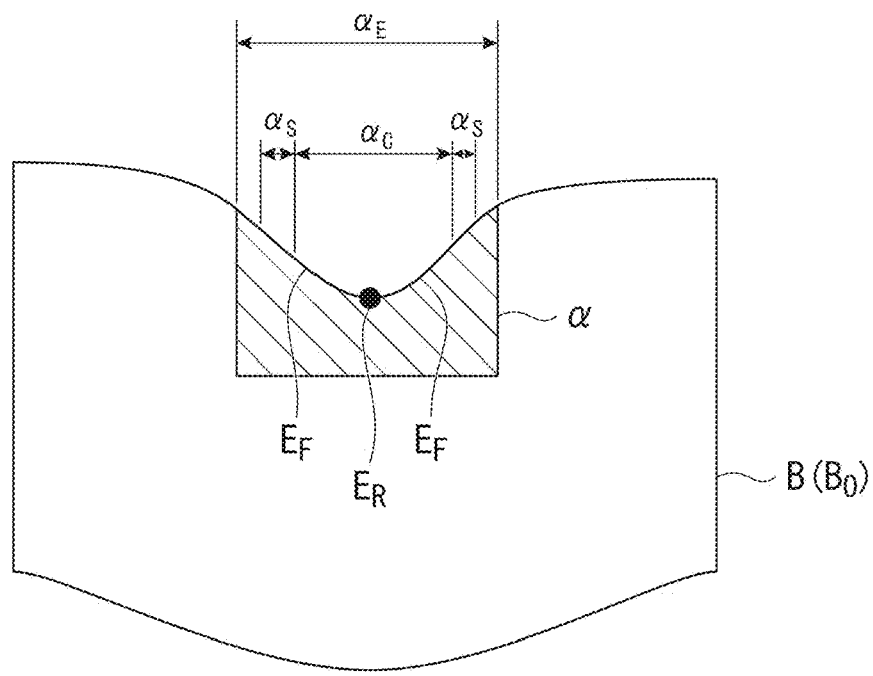
FIG. 4A is a schematic view illustrating a reference blank $B_0$.

In the forming failure region estimating process S3, as illustrated in FIG. 4A, a region, which includes an end edge portion $\alpha_E$ at which the forming failure evaluation index I exceeds a predetermined threshold within the reference blank $B_0$, is estimated as a forming failure region $\alpha$.

That is, the region including the end edge portion $\alpha_E$ at which the forming failure evaluation index I is high is extracted and estimated as the forming failure region $\alpha$ on the basis of the information of the forming failure evaluation index I which is acquired in the first forming failure evaluation index acquiring process S2.

When the end edge portion $\alpha_E$ at which the forming failure evaluation index exceeds the predetermined threshold is present in a plurality of places, a place at which the end edge portion $\alpha_E$ has a linear section $\alpha_S$ and a curvilinear section $\alpha_C$ is preferably selected. This is because the end edge portion can be reviewed in a wider range by setting the region having the linear section and the curvilinear section to a blank shape correction range and, as a result, localization of a strain distribution of the end edge portion in a circumferential direction can be relieved. The shape of the end edge portion $\alpha_E$ selected in this way is corrected by measures, which will be described below, so that a blank shape having a low possibility of a forming failure can be efficiently obtained.

(Corrected Blank Generating Process S4)

Figure 4B:
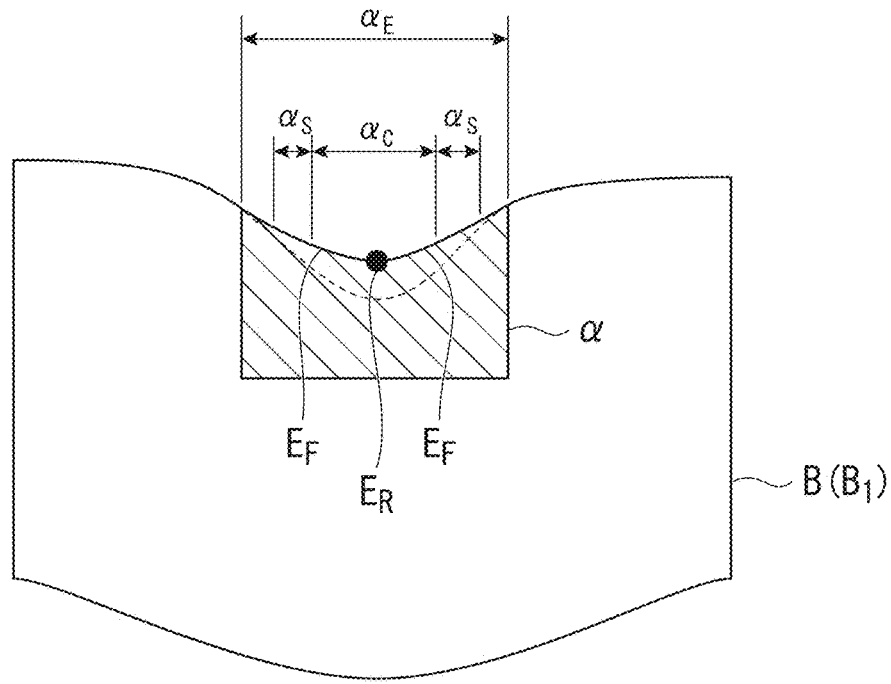
FIG. 4B is a schematic view illustrating a corrected blank $B_1$.
Figure 4C:
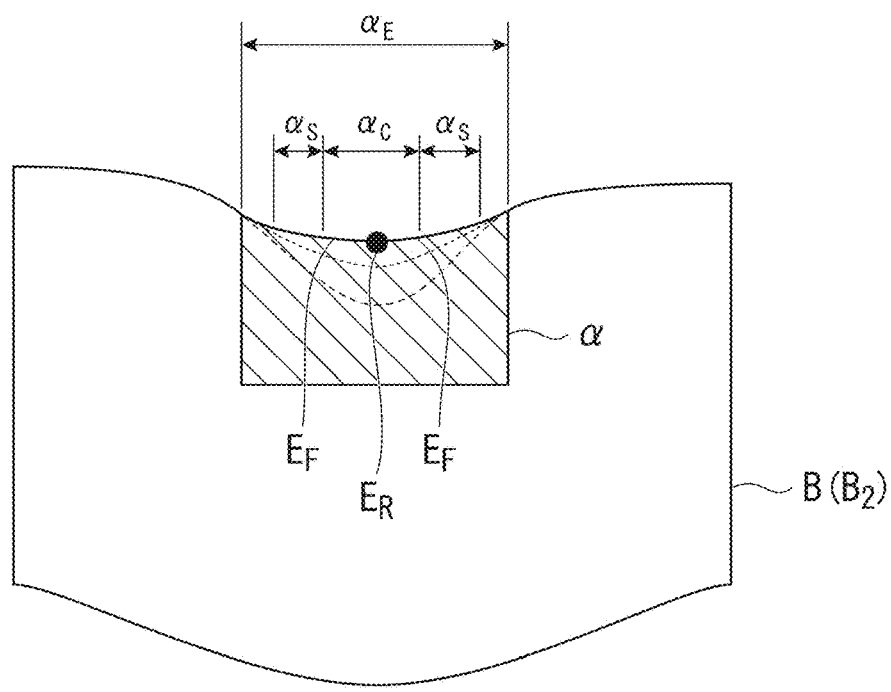
FIG. 4C is a schematic view illustrating a corrected blank $B_2$.

In the corrected blank generating process S4, with respect to the forming failure region $\alpha$ estimated in the forming failure region estimating process S3, a plurality of corrected blanks $B_i$ (where i=1, 2, 3 . . . , n) obtained by correcting a shape of the end edge portion $\alpha_E$ thereof are generated. Schematic views of the corrected blanks B1 and B2 are illustrated in FIGS. 4B and 4C.

Here, when a region including the end edge portion $\alpha_E$ having the linear section $\alpha_S$ and the curvilinear section $\alpha_C$ is estimated as the forming failure region $\alpha$ in the aforementioned forming failure region estimating process S3, a shape of a region including a singular point extracted from a curvature of the curvilinear section $\alpha_C$ within the end edge portion $\alpha_E$ of the reference blank $B_0$ is preferably corrected.

It is determined that a correction range (a movement range) includes an interval between two singular points between which a portion having a possibility of a shape failure is interposed. Thereby, a strain concentration of a portion having a high possibility of causing a shape failure can be reduced, and a strain concentration around the portion can also be simultaneously reduced. Both opposite ends of the correction range are preferably singular points, but at least one of the opposite ends of the correction range may be a singular point.

The measures to correct the shape of the end edge portion $\alpha_E$ include, for instance, the following measures.

(Step 1) A predetermined site (an element point) within the end edge portion $\alpha_E$ is set as a representative element point $E_R$, and a site (an element point) other than the representative element point $E_R$ within the end edge portion $\alpha_E$ is set as a following element point $E_F$.

(Step 2) The representative element point $E_R$ is moved by a predetermined amount ($X_{R1}$) in a predetermined direction, and the following element point $E_F$ is moved by a predetermined amount ($X_{F1}$) to follow the movement of the representative element point $E_R$. Thereby, a first corrected blank $B_1$ is generated.

(Step 3) Step 2 is repeated, namely the representative element point $E_R$ is moved by a predetermined amount ($X_{R2}$) in a predetermined direction and the following element point $E_F$ is moved by a predetermined amount ($X_{F2}$) to follow the movement of the representative element point $E_R$. Thereby, a second corrected blank $B_2$ is generated.

(Step 4) Similarly, step 2 is repeated such that n corrected blanks $B_n$ are generated.

In step 1, the representative element point $E_R$ may be any of "one element point," "a group of a plurality of consecutive element points," "a group of a plurality of non-consecutive element points," and "a plurality of non-consecutive element points."

At least one point of element points at which the forming failure evaluation index I is higher than an average value at the end edge portion $\alpha_E$ may be set as the representative element point $E_R$. An element point with the highest forming failure evaluation index I may be set as the representative element point $E_R$.

The representative element point $E_R$ is set in this way so that a blank shape having a low possibility of a forming failure can be efficiently obtained.

In step 2, it is preferable for the predetermined direction in which the representative element point $E_R$ is moved to be set to a normal direction of the end edge portion $\alpha_E$ at the representative element point $E_R$ because the blank shape having a low possibility of a forming failure can be efficiently obtained. The normal direction in this application allows an error of ±5°.

The moving direction is preferably set to be a direction in which a curvature is reduced at the end edge portion $\alpha_E$.

For example, it is determined whether the forming failure evaluation index I increases as the representative element point $E_R$ is moved in a predetermined direction, and when it is determined that the forming failure evaluation index I increases as the representative element point $E_R$ is moved in the direction, the representative element point $E_R$ may be moved in a direction opposite to the predetermined direction.

In step 2, the moving direction of the following element point $E_F$ is preferably a direction parallel to the moving direction of the closest representative element point $E_R$.

The movement amount ($X_{F1}$) of the following element point $E_F$ is preferably smaller than the movement amount of the representative element point $E_R$. The movement amount ($X_{F1}$) is preferably reduced in direct proportion to a separation distance of the following element point $E_F$ from the representative element point $E_R$. This can avoid the occurrence of a site at which the curvature distribution is suddenly changed in a newly generated corrected blank $B_n$ and efficiently obtain a blank shape having a low possibility of forming failure.

In step 3, the representative element point $E_R$ and the following element point $E_F$ are preferably moved by the same movement amount as the movement amount in step 2. That is, it is preferable that the element points are repeatedly moved in a predetermined direction by a predetermined amount so that the plurality of corrected blanks $B_i$ are generated.

(Second Calculating Process S5)

In the second calculating process S5, a forming analysis of forming the plurality of corrected blanks $B_i$ generated in the corrected blank generating process S4 into respective corrected formed products $P_i$ is made on the basis of the material parameters, the forming conditions, and the analytical models of the component which are used in the first calculating process S1, and information about the sheet thickness distribution $D_T$ and information about the plastic strain distribution $D_S$ are acquired by the calculation device.

(Second Forming Failure Evaluation Index Acquiring Process S6)

In the second forming failure evaluation index acquiring process S6, the forming failure evaluation index I is acquired for at least a part of a region in the corrected blank $B_i$ on the basis of the pieces of information about the sheet thickness distribution $D_T$ and the plastic strain distribution $D_S$ of the corrected blank $B_i$ acquired in the second calculating process S5.

That is, a possibility of a shape failure of a stretch flange fracture or a wrinkle is evaluated for each of the end edge portions $\alpha_E$ whose shapes are corrected.

(Blank Shape Determining Process S7)

In the blank shape determining process S7, a shape of the corrected blank $B_i$ with the smallest maximum value of the forming failure evaluation index I is determined as a shape of the blank B used for press forming.

In the blank shape determining process S7, when the maximum value of the forming failure evaluation index I of the determined corrected blank $B_i$ is higher than a threshold, namely when it is determined that none of the plurality of generated corrected blanks $B_i$ satisfies desired characteristics, the process returns to the forming failure region estimating process S3 and a threshold of the forming failure evaluation index I set during estimation of the forming failure region $\alpha$ including the end edge portion $\alpha_E$ within the reference blank $B_0$ is set to be low so that a range of the end edge portion $\alpha_E$ is widened. A virtual reference blank $B_0'$ including a virtual end edge portion $\alpha_E'$ to or from which a patch of a shape in which a change in curvature of the end edge portion $\alpha_E$ is smooth is added or excluded and used as the reference blank $B_0$. Thereby, the processes from the forming failure region estimating process S3 to the blank shape determining process S7 are performed, and a more suitable shape of the blank B can be determined.

According to the blank shape determining method described above, the shape of the end edge portion at which a possibility of causing a stretch flange fracture or a wrinkle is reduced can be efficiently determined, and a shape failure, such as a stretch flange fracture or a wrinkle, during press forming can be avoided without increasing the number of processes of the press forming.

Another aspect of the present invention includes a program that executes each of the processes in the blank shape determining method described in the above embodiment, and furthermore a recording medium that can be read by a calculation device in which the program is recorded.

To be specific, a blank shape determining program causes the calculation device to execute: a first calculating process P1 of making a forming analysis of forming the reference blank $B_0$ into the reference formed product $P_0$ on the basis of material parameters, forming conditions, and analytical models and acquiring the sheet thickness distribution $D_T$ and the plastic strain distribution $D_S$; a first forming failure evaluation index acquiring process P2 of acquiring the forming failure evaluation index I for the reference blank $B_0$ on the basis of the sheet thickness distribution $D_T$ and the plastic strain distribution $D_S$ that are acquired in the first calculating process P1; a forming failure region estimating process P3 of estimating a region, which includes the end edge portion $\alpha_E$ at which the forming failure evaluation index I exceeds a predetermined threshold within the reference blank $B_0$, as the forming failure region $\alpha$; a corrected blank generating process P4 of generating a plurality of corrected blanks $B_i$ (where i=1, 2, 3 ... n) in which a shape of the end edge portion $\alpha_E$ is corrected; a second calculating process P5 of making a forming analysis of forming the plurality of corrected blanks $B_i$ into the corrected formed products $P_i$ on the basis of the material parameters, the forming conditions, and the analytical models, and acquiring the sheet thickness distribution $D_T$ and the plastic strain distribution $D_S$; a second forming failure evaluation index acquiring process P6 of acquiring the forming failure evaluation index I for each of the corrected formed products $P_i$ on the basis of the sheet thickness distribution $D_T$ and the plastic strain distribution $D_S$ that are acquired in the second calculating process P5; and a blank shape determining process P7 of determining a shape of the corrected blank $B_i$ having a smallest maximum value of the forming failure evaluation index I as a shape of the blank B used for press forming.

Figure 5:
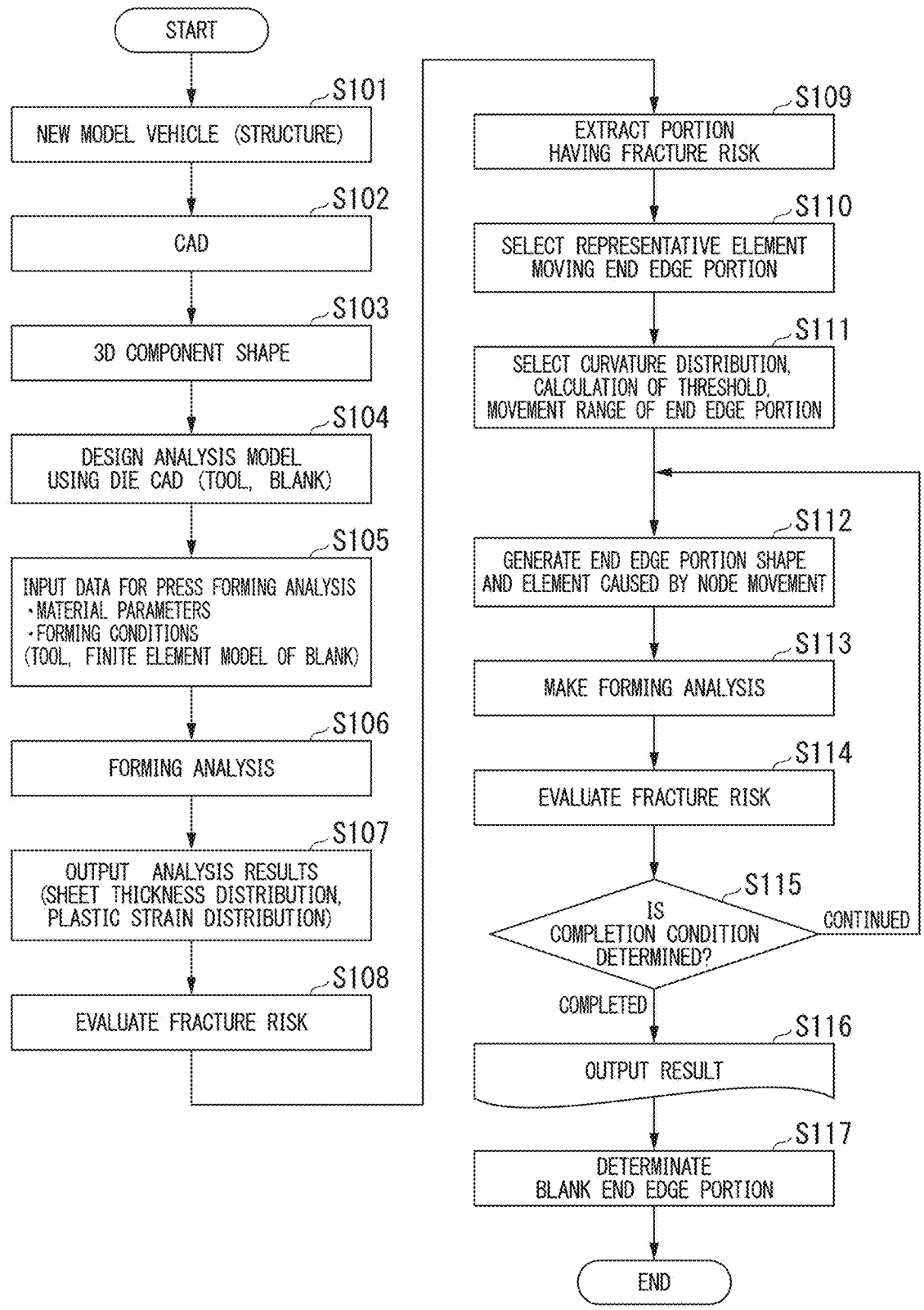
FIG. 5 is a flow chart illustrating an example of a process of determining a blank shape of a vehicle component using a calculation device.

In the blank shape determining method, an example of the process performed by the calculation device will be described with reference to FIG. 5. FIG. 5 is a flow chart illustrating an example of a process of determining a blank shape of a vehicle component which the calculation device forms into a steel sheet and which has a low possibility of stretch flange fracture.

A calculation device stores information about a structure of a vehicle to be manufactured (S101).

A three-dimensional shape of a vehicle component is input into the calculation device by computer-aided design (CAD) (S102).

The calculation device stores the input shape of the vehicle component (S103).

The calculation device stores information about a die designed by die CAD in order to determine whether press working is possible using the die (S104).

Next, formability is evaluated by forming analysis (S105 and S106).

The calculation device stores material parameters, forming conditions, and analytical models of a component used when the formability is evaluated (S105).

The calculation device calculates a sheet thickness distribution and a plastic strain distribution after forming using a forming analysis software program on the basis of the material parameters, the forming conditions, and the analytical models stored in S105 (S106).

Next, the calculation device extracts a portion having a possibility of causing a stretch flange fracture on the basis of the sheet thickness distribution and the plastic strain distribution of the formed vehicle component (S107 to S109).

The calculation device acquires the calculated sheet thickness distribution and the calculated plastic strain distribution after forming (S107).

Next, the calculation device evaluates the possibility of a stretch flange fracture over the entire formed vehicle component on the basis of the sheet thickness distribution and the plastic strain distribution after forming (S108).

The calculation device extracts a portion having a high possibility of a stretch flange fracture on the basis of the evaluation of the possibility of a stretch flange fracture in S108 including the sheet thickness distribution and the plastic strain distribution (S109).

Next, the calculation device changes a shape of the end edge portion and evaluates a possibility of a stretch flange fracture in the changed shape of the end edge portion. That is, the calculation device sequentially calculates the end edge portion when the vicinity of a node of the portion evaluated to have the possibility of a stretch flange fracture is moved up to a predetermined final movement amount in units of a predetermined unit movement amount in a moving direction (S110 to S114).

The calculation device determines a representative element moving the end edge portion (S110).

The calculation device determines each of the moving direction, a unit movement amount, a final movement amount, and a movement range of the end edge portion (S111).

The calculation device may display an image which shows that any of a positive direction, which is a direction in which a curvature is reduced, and a negative direction, which is a direction opposite to the positive direction, is selected as the moving direction to a user.

The calculation device may display an image in which both the positive direction and the negative direction are selected as a moving direction to a user.

The calculation device may display an image which shows that the unit movement amount and the final movement amount are selected as the moving direction to the user.

The calculation device determines the shape of the end edge portion when the end edge portion is moved in the moving direction, by the unit movement amount, by the final movement amount, and in the movement range, which are determined in S111, relative to each portion determined in S110 (S112).

Next, the calculation device makes a forming analysis of the component having the end edge portion generated in S112 (S113) and evaluates the possibility of a stretch flange fracture with respect to all end elements designated in the movement range (S114).

Next, the calculation device outputs each of the possibility of a stretch flange fracture at an end edge portion that is moved he final movement amount in units of the unit movement amount after the end edge portion is changed to the movement range, and determines a shape of an end edge portion with the lowest possibility of a stretch flange fracture (S115 to S117).

The calculation device determines whether the end edge portion is moved up to the final movement amount (S115). When the calculation device determines that the end edge portion is not moved up to the final movement amount, the process returns to S112. Hereinafter, the calculation device repeats the processes of S112 to S114 until it is determined that the end edge portion is moved up to the final movement amount while moving the end edge portion in the moving direction determined in S111 in units of the unit movement amount.

When it is determined that the end edge portion is moved up to the final movement amount, the calculation device determines that a completion condition is satisfied and the process proceeds to S116. When the process proceeds to S116, the calculation device outputs the possibility of a stretch flange fracture at the end edge portion that is moved up to the final movement amount in units of the unit movement amount as a report (S116). The calculation device automatically determines the shape of the end edge portion with the lowest possibility of a stretch flange fracture (S117).

The calculation device searches for a minimum value of the fracture risk ratio $\varepsilon_1/\varepsilon_1^*$ at a plurality of end edge portions acquired by repeating the processes of S112 to S114 a plurality of times. Next, the calculation device determines an end edge portion at which the fracture risk ratio $\varepsilon_1/\varepsilon_1^*$ is a minimum value as a result of the search. The calculation device determines that the end edge portion at which the fracture risk ratio $\varepsilon_1/\varepsilon_1^*$ is determined to be the minimum value is the end edge portion with the lowest possibility of a stretch flange fracture.

The calculation device may determine whether the possibility of a stretch flange fracture increases with the movement of the end edge portion in the moving direction. When it is determined that the possibility of the stretch flange fracture increases with the movement of the end edge portion in the moving direction, the calculation device can invert the moving direction.

Each of the steps constituting the press forming method according to the present embodiment can be realized by an operation based on a program stored in a random access memory (RAM) and a read only memory (ROM) of a computer. A program for executing each of the steps constituting the press forming method according to the present embodiment and a computer-readable recording medium in which the program is recorded are included in the embodiment of the present invention.

To be specific, the program for executing each of the steps constituting the press forming method according to the present embodiment is recorded in a recording medium such as a compact disk read only memory (CD-ROM) or is provided to a computer via various transmission media. The recording medium in which the program for executing each of the steps constituting the press forming method according to the present embodiment is recorded may be a flexible disk, a hard disk, a magnetic tape, a magneto optical tape, a non-volatile memory card, or the like. As a transmission medium of the program for executing each of the steps constituting the determining method according to the present invention, a communication medium in a computer network system for propagating and supplying program information as a carrier wave can be used. The computer network is a local area network (LAN), a wide area network (WAN) such as the Internet, a wireless communication network, or the like, and the transmission medium is a wired line such as an optical fiber and a wireless channel.

The program included in the present embodiment is not limited to a program in which the computer executes the supplied program to realize the aforementioned function. For example, a program used when each of the steps constituting the press forming method according to the present embodiment cooperates with an operating system (OS), other application software, or the like operated in the computer so that the aforementioned function included in the present invention is realized. A program, which is used when all or some of the processes of the supplied program are performed by function extension boards or units of the computer to realize the aforementioned function, is included in the present invention.

Figure 6:
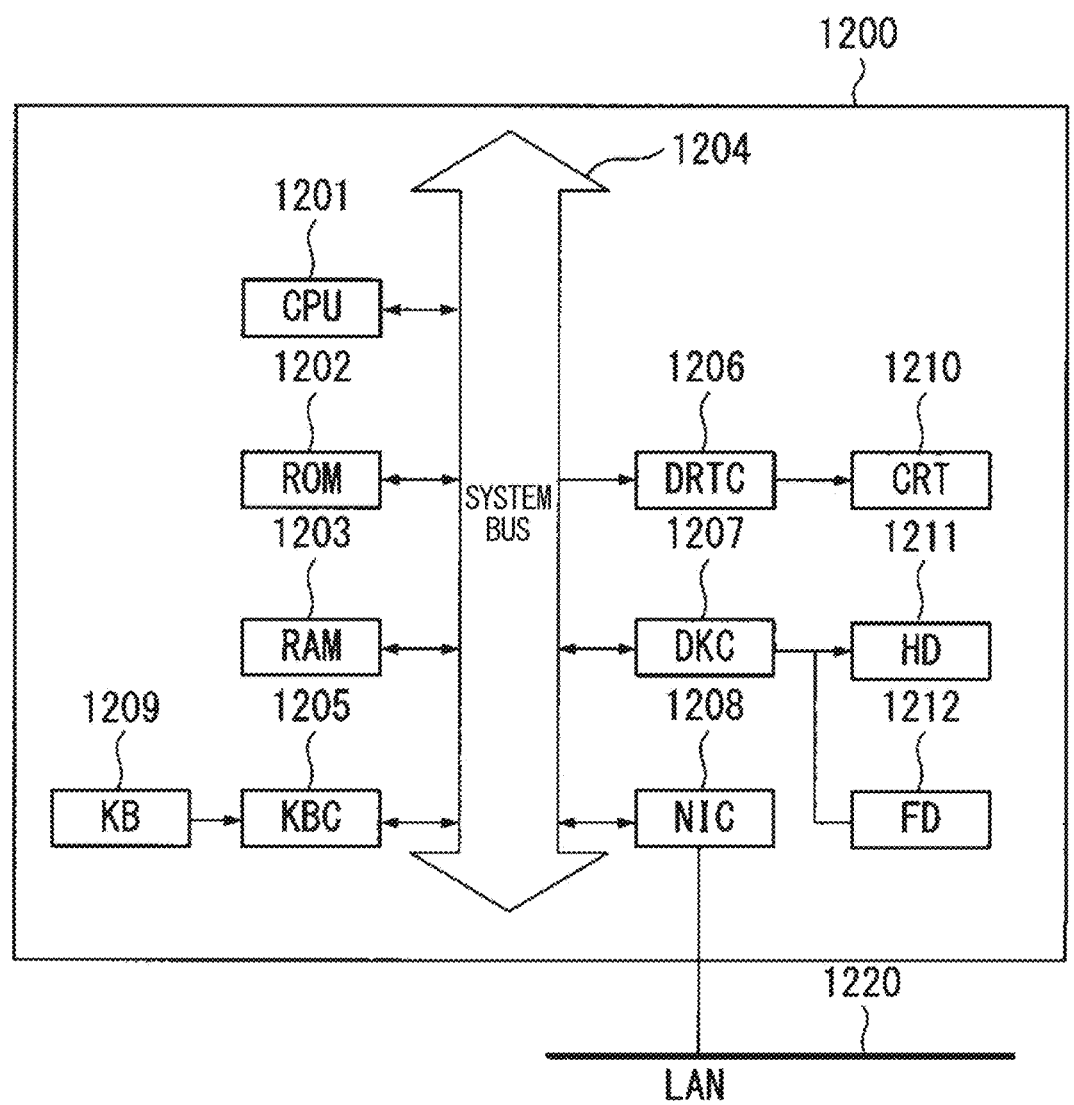
FIG. 6 is a schematic view illustrating an internal constitution of the calculation device.

FIG. 6 is a schematic view illustrating an internal constitution of the calculation device that performs the press forming method according to the present embodiment.

In an example, a calculation device 1200, which is a personal computer (PC), includes a central processing unit (CPU) 1201. The calculation device 1200 executes device control software that is stored in a ROM 1202 or a hard disk (HD) 1211 or is supplied by a flexible disk drive (FD) 1212. The calculation device 1200 collectively controls each device connected to a system bus 1204. The method according to the present embodiment is realized by a program stored in the CPU 1201 and the ROM 1202 or the hard disk (HD) 1211 of the calculation device 1200. A RAM 1203 functions as a main memory and a work area of the CPU 1201. A keyboard controller (KBC) 1205 controls instruction input from a keyboard (KB) 1209 and a device (not shown). A CRT controller (CRTC) 1206 controls display of a CRT display (CRT) 1210. A disk controller (DKC) 1207 controls access to the HD 1211 and the FD 1212 in which a boot program, a plurality of applications, an edition file, a user file, and a network management program are stored.

Here, the boot program is a startup program that initiates execution of hardware and software of the PC. A network information center (NIC) 1208 performs interactive data communication among a network printer, another network device, and another PC.

Although the specific examples of the present invention have been described above on the basis of the embodiment, the present invention is not limited to these examples. The present invention includes various alternations and modifications of the specific examples exemplified above.

The present invention includes a blank obtained using the blank shape determining method, a press formed product obtained by press forming the blank, and a press forming method having press forming processes of press forming a blank.

For example, the blank is not limited to a steel sheet and can be a metal sheet such as an aluminum sheet or a titanium sheet, a glass fiber reinforced resin plate such as FRP or FRTP, or composite plates thereof.

Examples

Hereinafter, an example in which the method according to the embodiment is applied to a simple component simulating a rear side of a front side member will be described.

To provide a flange at the rear side of the front side member, the flange is sometimes flanged at the rear side of the front side member by a restriking process. When a high-strength steel sheet is adopted for the front side member, the steel sheet is bent along a ridgeline having a gentle curvature in a longitudinal direction so that there is a possibility of a stretch flange fracture occurring at a flange part.

Figure 7A:
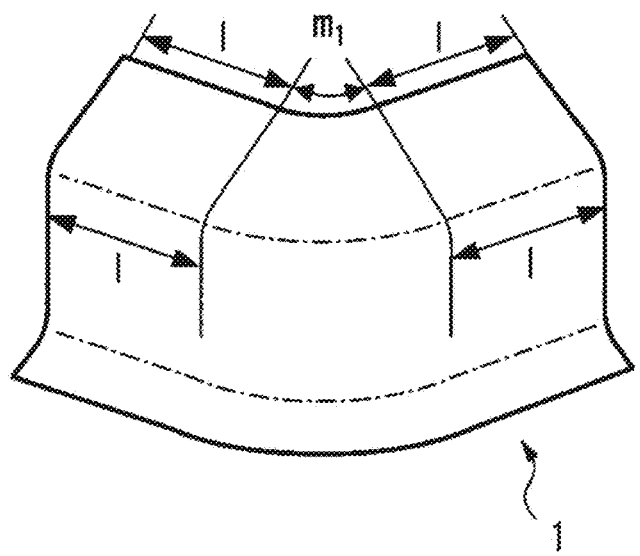
FIG. 7A is a view illustrating a press forming process of a front side member, and a view illustrating a draw forming process thereof.

FIG. 7A is a view illustrating a press forming process of a front side member, and is a view illustrating a draw forming process.

Figure 7B:
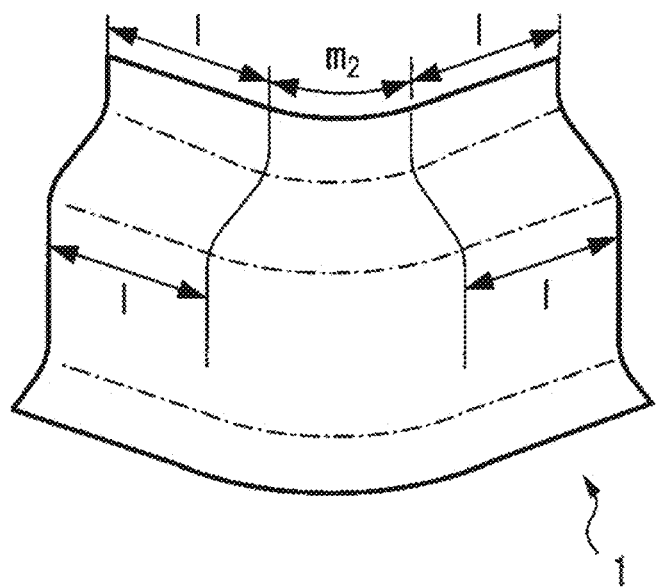
FIG. 7B is a view illustrating the press forming process of the front side member, and a view illustrating a flange-up process performed after the draw forming process illustrated in FIG. 7A.

FIG. 7B is a view illustrating a flange-up process performed after the draw forming process illustrated in FIG. 7A.

A blank of a component 1 is a 440 MPa-class cold-rolled steel sheet whose sheet thickness is 1.6 mm. After the draw forming illustrated in FIG. 7A, a flange is formed on the component 1 by the flange-up process illustrated in FIG. 7B. When the flange is formed by the flange-up process, a flange-up end undergoes a change in local length from a first length m1 to a second length m2 so that elongation strain is introduced thereto. When the elongation strain introduced by the change of the local length exceeds a fracture limit major strain of the blank of the component 1, the flange-up end fractures.

Figure 8:
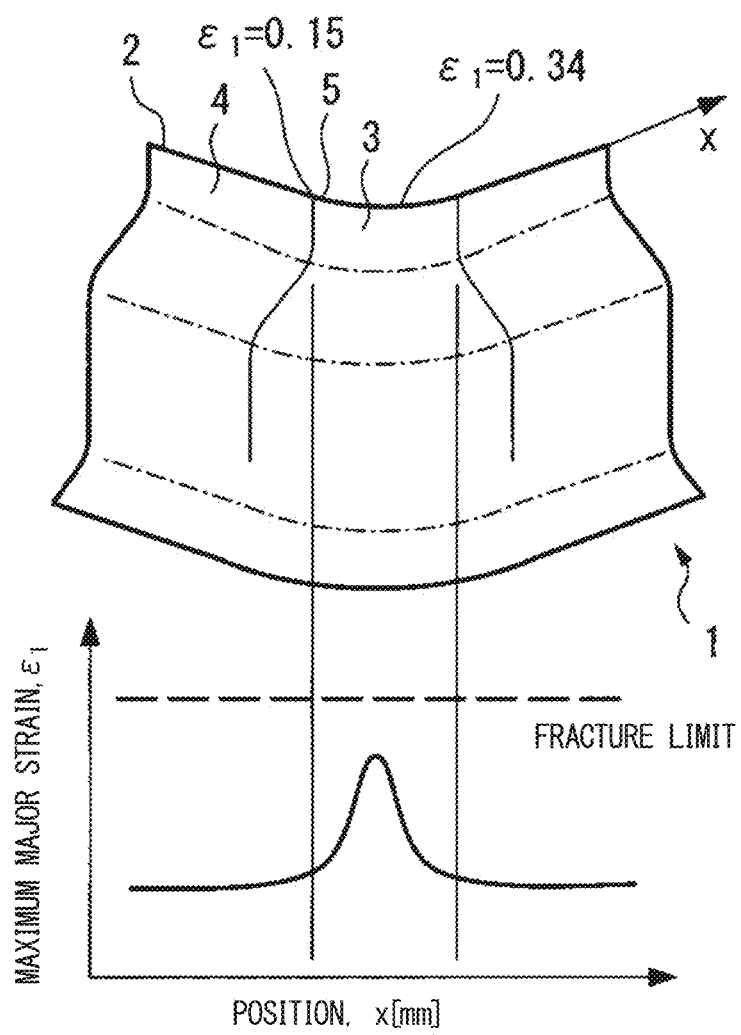
FIG. 8 is a view illustrating an actually measured value of distribution of circumferential strain of a flange end of the component on which a flange is formed by a flange-up process.

FIG. 8 is a view illustrating an actually measured value of a distribution of a circumferential strain of the flange end of the component 1 on which the flange is formed by the flange-up process.

A strain gradient was observed at a flange end 2 of the component 1 in a circumferential direction thereof. A maximum major strain having a maximum value of 0.34 was observed at a bent part 3 thereof. A maximum major strain of 0.15 was observed at a connection part 5 between the bent part 3 and a linear section 4.

Figure 9:
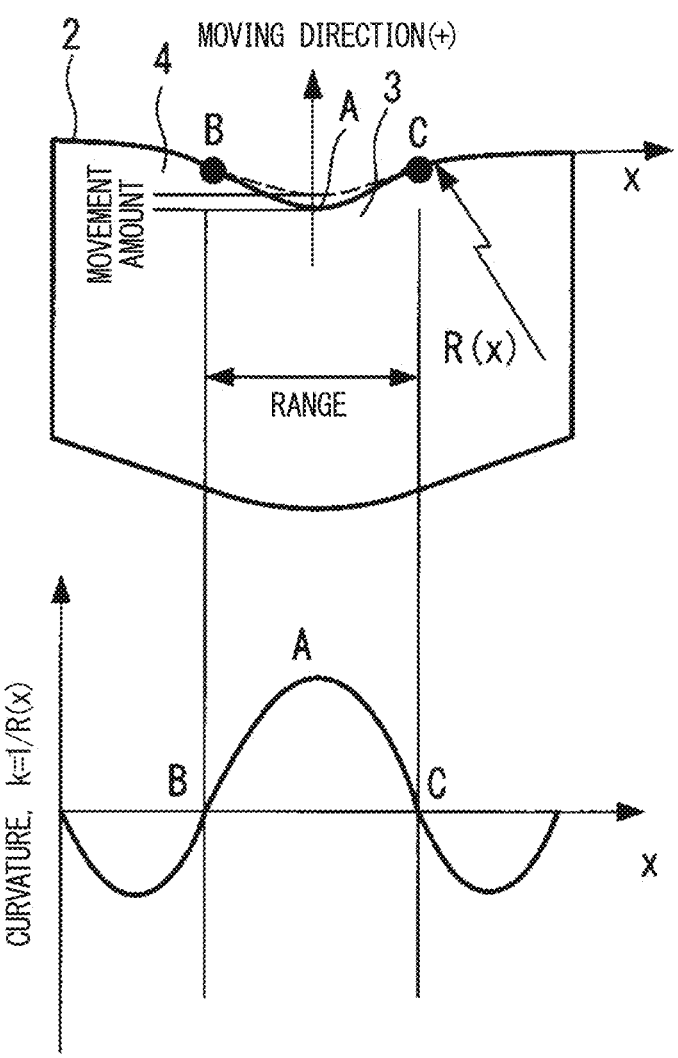
FIG. 9 is a view illustrating an aspect in which an end edge portion is moved in an example, and a curvature before movement.

FIG. 9 is a view illustrating an aspect in which an end edge portion is moved by the method according to the embodiment, and a curvature distribution prior to the movement.

In the present example, an element A located at a portion at which a curvature ($\kappa=1/R(x)$) of the bent part 3 is large and a strain concentration is high is configured to be moved as a representative element. A moving direction of the element A is set to an upward direction in a vertical direction. A unit movement amount is set to 0.2 mm, and a movement range is set to 1.0 mm in the positive direction, namely in the upward direction, and 0.4 mm in the negative direction, namely in a downward direction. That is, a final movement amount is 1.0 mm in the positive direction. A calculation device moves the element A from −0.4 mm, which is a position at which the element A is moved in the downward direction by 0.4 mm, to +1.0 mm of the final movement amount in the positive direction in units of a unit movement amount of 0.2 mm. The movement range is between a first singular point B and a second singular point C at which a curvature $\kappa$ shown in FIG. 9 is 0. The calculation device moves the element A up to a maximum movement amount in units of the unit movement amount so that a blank of an end edge portion moving the element included in the movement range is provided for forming analysis, and a possibility of stretch flange fracture of each of elements included in the movement range is evaluated.

Figure 10:
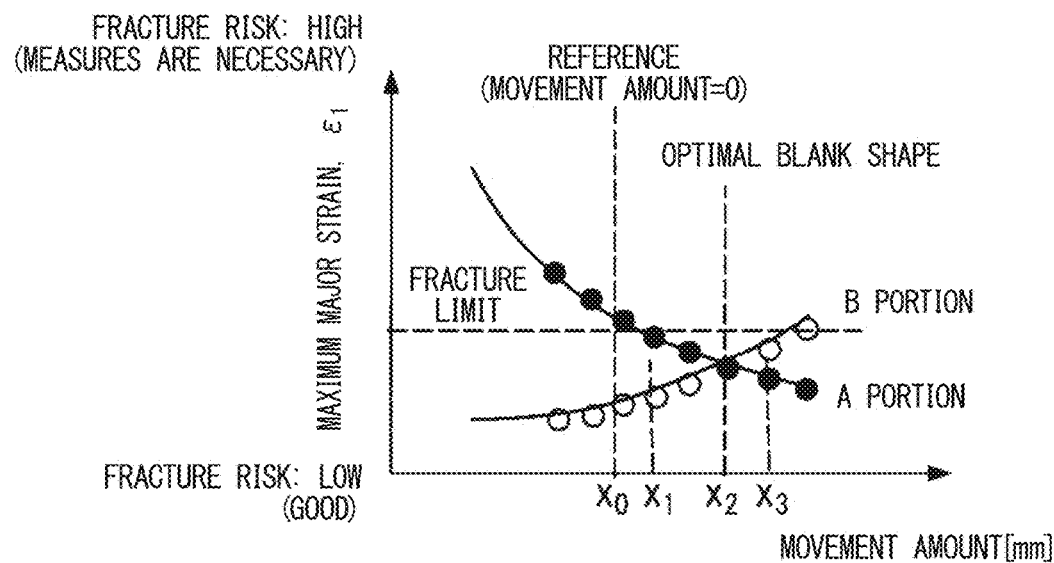
FIG. 10 is a graph illustrating a result of evaluating a possibility of a stretch flange fracture of an element included in a correction range in the example.

FIG. 10 is a graph showing results of evaluating a possibility of stretch flange fracture of each of elements included in a movement range according to an example. In FIG. 10, the horizontal axis indicates a movement amount, the vertical axis indicates the maximum major strain $\varepsilon_1$, and a broken line extending parallel to the horizontal axis indicates a fracture limit. On the horizontal axis, $x_0$ indicates a position at which the movement amount is 0 mm, $x_1$ indicates a position at which the movement amount is 0.2 mm, $x_2$ indicates a position at which the movement amount is 0.6 mm, and $x_3$ indicates a position at which the movement amount is 0.8 mm. In FIG. 10, a black circle indicates the maximum major strain $\varepsilon_1$ of the element A, and a white circle indicates the maximum major strain $\varepsilon_1$ of the element B.

The maximum major strain $\varepsilon_1$ of the element A decreases as the end edge portion moves toward a positive side, and the maximum major strain $\varepsilon_1$ of the element B increases as the end edge portion moves to the positive side. The maximum major strain $\varepsilon_1$ of the element A when the movement amount is $x_0$, which corresponds to the maximum major strain $\varepsilon_1$ of the element A of the component 1 on which the flange is formed by the flange-up process shown in FIG. 8, is greater than the fracture limit, and the maximum major strain $\varepsilon_1$ of the element A when the movement amounts are from $x_1$ to $x_3$ is less than the fracture limit. The maximum major strain $\varepsilon_1$ of the element B when the movement amounts are from $x_1$ to $x_3$ is less than the fracture limit. The calculation device determines that a possibility of causing a stretch flange fracture when the movement amount is $x_2$ is low.

Figure 11:
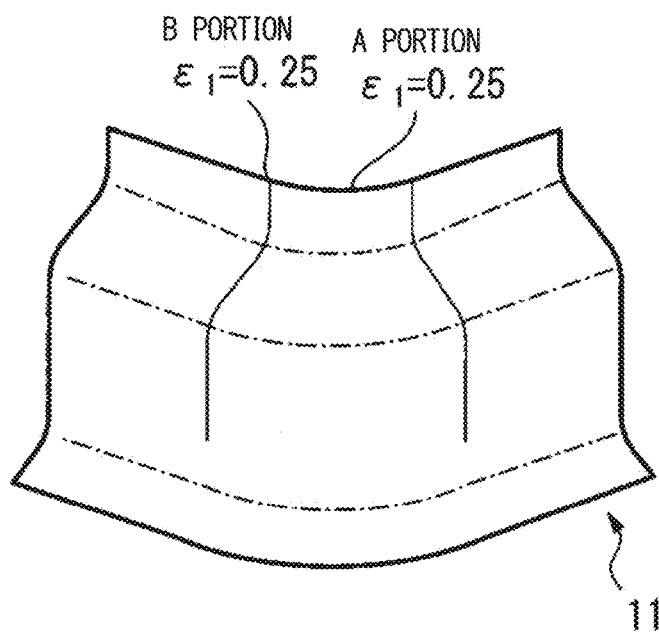
FIG. 11 is a view illustrating strain distribution when the component is formed in the example.

FIG. 11 is a view illustrating a strain distribution when a component is formed by the method according to the present embodiment.

A component 11 moves the element A of the flange upward relative to the component 1 by 0.6 mm so that the strain concentration is optimized.

In the component 11, the maximum major strain $\varepsilon_1$ of the element A and the maximum major strain $\varepsilon_1$ of the element B are both 0.25.

INDUSTRIAL APPLICABILITY

According to the present invention, a blank shape determining method in which a shape of an end edge portion having a low possibility of causing a stretch flange fracture or a wrinkle is efficiently determined and a shape failure, such as a stretch flange fracture or a wrinkle, during press forming can be avoided without increasing the number of processes of the press forming, a blank obtained using the blank shape determining method, a press formed product, a press forming method, a computer program, and a recording medium can be provided.

REFERENCE SIGNS LIST

B: Blank
$B_0$: Reference blank
$P_0$: Reference formed product
$B_i$: Corrected blank
$P_i$: Corrected formed product
α: formingforming failure region
$α_E$: End edge portion
$α_S$: Linear section
$α_C$: Curvilinear section
$E_R$: Representative element point
$E_F$: Following element point
I: Forming failure evaluation index
$D_T$: Sheet thickness distribution
$D_S$: Strain distribution

The invention claimed is:
1. A press forming method comprising:
a first calculating process of making a forming analysis of forming a reference blank ($B_0$) into a reference formed product ($P_0$) on the basis of material parameters, forming conditions, and analytical models, and acquiring a sheet thickness distribution ($D_T$) and a plastic strain distribution ($D_S$);
a first faulting failure evaluation index acquiring process of acquiring a forming failure evaluation index (I) for the reference blank ($B_0$) on the basis of the sheet thickness distribution ($D_T$) and the plastic strain distribution ($D_S$) that are acquired in the first calculating process;
a forming failure region estimating process of estimating a region, which includes an end edge portion ($α_E$) at which the forming failure evaluation index (I) exceeds a predetermined threshold, within the reference blank ($B_0$) as a forming failure region (α);
a corrected blank generating process of generating a plurality of corrected blanks ($B_i$) (where i=1, 2, 3 . . . n), in each of which a shape of the end edge portion ($α_E$) is corrected;
a second calculating process of making a forming analysis of forming the plurality of corrected blanks ($B_i$) into corrected formed products ($P_i$) on the basis of the material parameters, the forming conditions, and the analytical models, and acquiring the sheet thickness distribution ($D_T$) and the plastic strain distribution ($D_S$);
a second forming failure evaluation index acquiring process of acquiring the forming failure evaluation index (I) for the corrected formed products ($P_i$) on the basis of the sheet thickness distribution ($D_T$) and the plastic strain distribution ($D_S$) that are acquired in the second calculating process;
a blank shape determining process of determining a shape of the corrected blank ($B_i$) having a smallest maximum value of the forming failure evaluation index (I) as a shape of a blank (B) provided for press forming; and
a press forming process of press forming the blank based on the determined shape.
2. The press forming method according to claim 1, wherein in the forming failure region estimating process, the end edge portion ($α_E$) included in the forming failure region (α) includes a linear section ($α_S$) and a curvilinear section ($α_C$).
3. The press forming method according to claim 2, wherein in the corrected blank generating process, a shape of a region including a singular point extracted from a curvature of the curvilinear section ($α_C$) within the end edge portion ($α_E$) of the reference blank ($B_0$) is corrected to generate the plurality of corrected blanks ($B_i$).
4. The press forming method according to claim 1, wherein:
the corrected blank generating process includes: within the end edge portion ($α_E$) included in the forming failure region (α),
setting at least one of element points at which the forming failure evaluation index (I) is higher than an average value at the end edge portion ($α_E$) as a representative element point ($E_R$); and
setting each element point other than the representative element point ($E_R$) as a following element point ($E_F$); and
the representative element point ($E_R$) and the following element point ($E_F$) are moved a plurality of times in a predetermined direction to generate the plurality of corrected blanks ($B_i$).
5. The press forming method according to claim 4, wherein in the corrected blank generating process, the predetermined direction is a normal direction of the end edge portion ($α_E$) at the representative element point ($E_R$).
6. The press forming method according to claim 4, wherein in the corrected blank generating process, the element points are moved in the predetermined direction in units of predetermined amount to generate the plurality of corrected blanks ($B_i$).
7. The press forming method according to claim 4, wherein in the corrected blank generating process, a single movement amount of the representative element point ($E_R$) is smaller than that of the following element point ($E_F$).
8. The press forming method according to claim 4, wherein the corrected blank generating process includes:
determining whether the forming failure evaluation index (I) increases as the representative element point ($E_R$) is moved in the predetermined direction; and
when it is determined that the forming failure evaluation index (I) increases as the representative element point ($E_R$) is moved in the predetermined direction, moving the representative element point ($E_R$) in a direction opposite to the predetermined direction to generate the plurality of corrected blanks ($B_i$).
9. The press forming method according to claim 1, wherein:
a forming failure is a stretch flange fracture; and
the forming failure evaluation index (I) is a sheet thickness decrease rate.
10. The press forming method according to claim 1, wherein:
a forming failure is a stretch flange fracture; and
the forming failure evaluation index (I) is a hole expansion rate.
11. The press forming method according to claim 1, wherein:
a forming failure is a stretch flange fracture; and
the forming failure evaluation index (I) is a comparative value between a maximum major strain ($ε_1$) and a fracture limit major strain ($ε_1^*$).
12. The press forming method according to claim 1, wherein:

a forming failure is a wrinkle; and
the forming failure evaluation index (I) is a sheet thickness increase rate.

13. A non-transitory computer-readable recording medium in which a computer program is recorded, the computer program executes:
a first calculating process of making a forming analysis of forming a reference blank ($B_0$) into a reference formed product ($P_0$) on the basis of material parameters, forming conditions, and analytical models, and acquiring a sheet thickness distribution ($D_T$) and a plastic strain distribution ($D_S$);
a first forming failure evaluation index acquiring process of acquiring a forming failure evaluation index (I) for the reference blank ($B_0$) on the basis of the sheet thickness distribution ($D_T$) and the plastic strain distribution ($D_S$) that are acquired in the first calculating process;
a forming failure region estimating process of estimating a region, which includes an end edge portion ($\alpha_E$) at which the forming failure evaluation index (I) exceeds a predetermined threshold within the reference blank ($B_0$), as a forming failure region ($\alpha$);
a corrected blank generating process of generating a plurality of corrected blanks ($B_i$) (where i=1, 2, 3 . . . n), in each of which a shape of the end edge portion ($\alpha_E$) is corrected;
a second calculating process of making a forming analysis of forming the plurality of corrected blanks ($B_1$) into corrected formed products ($P_i$) on the basis of the material parameters, the forming conditions, and the analytical models, and acquiring the sheet thickness distribution ($D_T$) and the plastic strain distribution ($D_S$);
a second forming failure evaluation index acquiring process of acquiring the forming failure evaluation index (I) for the corrected formed products ($P_i$) on the basis of the sheet thickness distribution ($D_T$) and the plastic strain distribution ($D_S$) that are acquired in the second calculating process;
a blank shape determining process of determining a shape of the corrected blank ($B_i$) having a smallest maximum value of the forming failure evaluation index (I) as a shape of a blank (B) provided for press forming; and
a press forming process of press forming the blank based on the determined shape.

14. The non-transitory computer-readable recording medium in which a computer program is recorded according to claim 13, wherein in the forming failure region estimating process, the end edge portion ($\alpha_E$) included in the forming failure region ($\alpha$) includes a linear section ($\alpha_S$) and a curvilinear section ($\alpha_C$).

15. The non-transitory computer-readable recording medium in which a computer program is recorded according to claim 14, wherein in the corrected blank generating process, a shape of a region including a singular point extracted from a curvature of the curvilinear section ($\alpha_C$) within the end edge portion ($\alpha_E$) of the reference blank ($B_0$) is corrected to generate the plurality of corrected blanks ($B_i$).

16. The non-transitory computer-readable recording medium in which a computer program is recorded according to claim 13, wherein:
the corrected blank generating process includes: within the end edge portion ($\alpha_E$) included in the forming failure region ($\alpha$),
setting at least one of element points at which the forming failure evaluation index (I) is higher than an average value at the end edge portion ($\alpha_E$) as a representative element point ($E_R$); and
setting each of element points other than the representative element point ($E_R$) as a following element point ($E_F$); and
the representative element point ($E_R$) and the following element point ($E_F$) are moved a plurality of times in a predetermined direction to generate the plurality of corrected blanks ($B_i$).

17. The non-transitory computer-readable recording medium in which a computer program is recorded according to claim 16, wherein in the corrected blank generating process, the predetermined direction is a normal direction of the end edge portion ($\alpha_E$) at the representative element point ($E_R$).

18. The non-transitory computer-readable recording medium in which a computer program is recorded according to claim 16, wherein in the corrected blank generating process, the element points are moved in the predetermined direction in units of predetermined amount to generate the plurality of corrected blanks ($B_i$).

19. The non-transitory computer-readable recording medium in which a computer program is recorded according to claim 16, wherein in the corrected blank generating process, a single movement amount of the representative element point ($E_R$) is smaller than that of the following element point ($E_F$).

20. The non-transitory computer-readable recording medium in which a computer program is recorded according to claim 16, wherein the corrected blank generating process includes:
determining whether the forming failure evaluation index (I) increases as the representative element point ($E_R$) is moved in the predetermined direction; and
when it is determined that the forming failure evaluation index (I) increases as the representative element point ($E_R$) is moved in the predetermined direction, moving the representative element point ($E_R$) in a direction opposite to the predetermined direction to generate the plurality of corrected blanks ($B_i$).

21. The non-transitory computer-readable recording medium in which a computer program is recorded according to claim 13, wherein:
a forming failure is a stretch flange fracture; and
the forming failure evaluation index (I) is a sheet thickness decrease rate.

22. The non-transitory computer-readable recording medium in which a computer program is recorded according to claim 13, wherein:
a forming failure is a stretch flange fracture; and
the forming failure evaluation index (I) is a hole expansion rate.

23. The non-transitory computer-readable recording medium in which a computer program is recorded according to claim 13, wherein:
a forming failure is a stretch flange fracture; and
the forming failure evaluation index (I) is a comparative value between a maximum major strain ($\varepsilon_1$) and a fracture limit major strain ($\varepsilon_1^*$).

24. The non-transitory computer-readable recording medium in which a computer program is recorded according to claim 13, wherein:
a forming failure is a wrinkle; and
the forming failure evaluation index (I) is a sheet thickness increase rate.

* * * * *